UNITED STATES PATENT OFFICE.

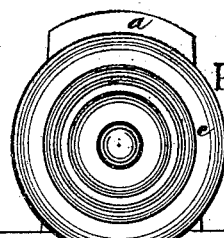
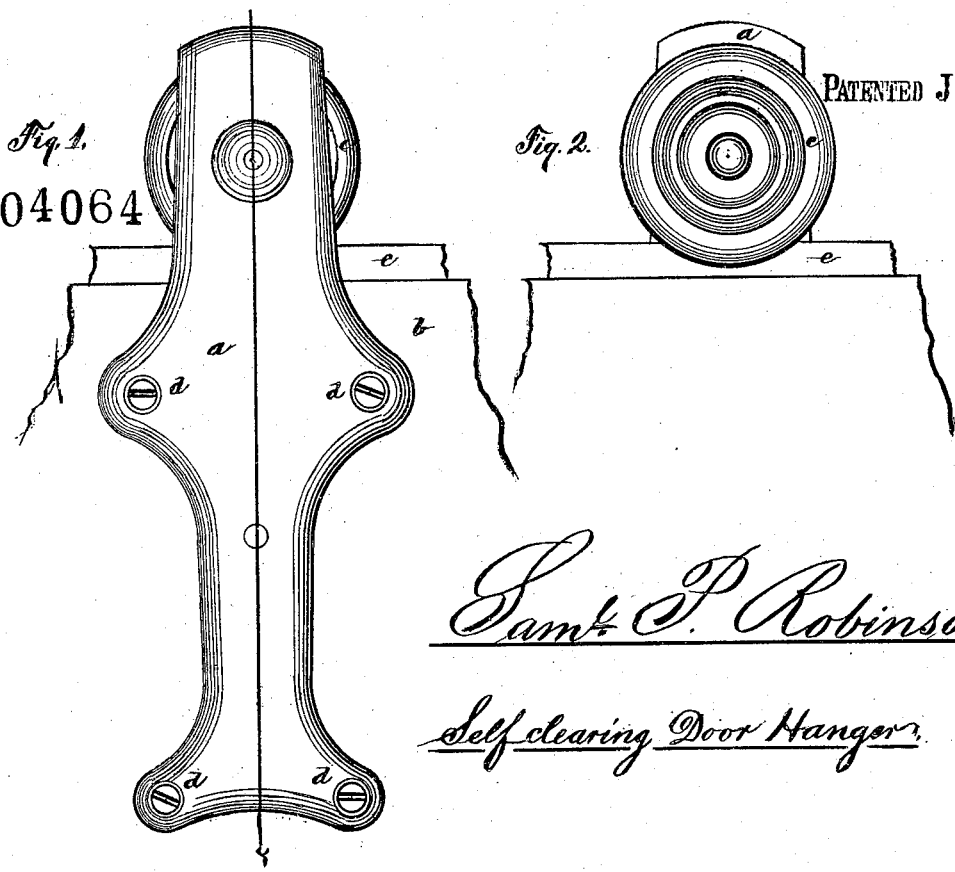
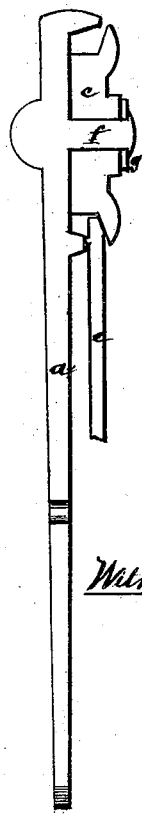
104064
PATENTED JUN 7 1870
Sam¹ P. Robinson's
Self clearing Door Hanger.
Witnesses:
John Bachelder
L. E. Hill
Samuel P. Robinson
Inventor

SAMUEL P. ROBINSON, OF CANTERBURY, CONNECTICUT.

IMPROVED DOOR-HANGER.

Specification forming part of Letters Patent No. 104,064, dated June 7, 1870.

*To all whom it may concern:*

Be it known that I, SAMUEL P. ROBINSON, of Canterbury, in the county of Windham and State of Connecticut, have invented a new and Improved Mode of Constructing Door-Hangers, which I denominate a Self-Clearing Door-Hanger; and I do hereby declare that the following is a full and exact description of the construction and operation of the same, reference being had to the annexed drawings, making a part of this specification, in which—

Figure 1 is a front elevation secured to a door and resting on a section of track as in use. Fig. 2 is a reverse of Fig. 1, secured to the door in same manner; and Fig. 3, a cross-section parted through the center longitudinally, as indicated by the red lines $y\,y$ in Fig. 1.

Like letters refer to like parts in the drawings.

$a$ represents the frame, which is attached to the door $b$ by screws $d\,d\,d\,d$, and supports the truck $c$. $e$ represents a section of track secured to the building. The pin or axis $f$, upon which the truck revolves, is set in the mold and the frame cast onto one end of it, and the truck $c$ held in position by upsetting the other end against the washer $g$. The friction-truck $c$ has beveled flange upon its periphery, instead of the ordinary straight flange or groove.

With ordinary truck-door hangings, doors are frequently thrown from the track by the displacement of the ends of the bars or rods put up in sections, caused by warping or swelling of the lumber used in the construction of the building to which the track is secured, drawing of nails and screws by expansion and contraction of the track, and other causes. By constructing the friction-truck $c$ in the manner herein described, the door is crowded back to its place, instead of rising over the ends of displaced sections of track or running off.

What I claim as my invention, and desire to secure by Letters Patent, is—

The combination of the beveled truck $c$ with the frame $a$, substantially as constructed, and for the purpose specified.

SAMUEL P. ROBINSON.

Witnesses:
MARSHAL SMITH,
JOHN BACHELDER.